(12) United States Patent
Wahls et al.

(10) Patent No.: US 7,513,573 B2
(45) Date of Patent: Apr. 7, 2009

(54) CONTINUOUS RECLINER

(75) Inventors: Robert Wahls, Commerce Township, MI (US); James S. Wawrzyniak, Warren, MI (US); Kenneth McQueen, Leonard, MI (US); Eric Brines, White Lake, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/520,115

(22) Filed: Sep. 12, 2006

(65) Prior Publication Data

US 2008/0061616 A1 Mar. 13, 2008

(51) Int. Cl.
*B60N 2/235* (2006.01)
(52) U.S. Cl. ........................ 297/362; 297/367
(58) Field of Classification Search ................. 297/362, 297/367
See application file for complete search history.

(56) References Cited

U.S. PATENT DOCUMENTS

| | | | | |
|---|---|---|---|---|
| 4,657,303 | A | * | 4/1987 | Croft ........................... 297/362 |
| 4,781,416 | A | * | 11/1988 | Johnson et al. .............. 297/362 |
| 5,096,261 | A | | 3/1992 | Baloche |
| 5,123,703 | A | * | 6/1992 | Morris et al. ................ 297/362 |
| 5,154,475 | A | | 10/1992 | Kafitz |
| 5,188,571 | A | | 2/1993 | Boltze et al. |
| 5,277,672 | A | | 1/1994 | Droulon et al. |
| 5,312,158 | A | | 5/1994 | Wittig et al. |
| 5,524,970 | A | | 6/1996 | Kienke et al. |
| 5,573,345 | A | | 11/1996 | Voss et al. |
| 5,586,833 | A | | 12/1996 | Vossmann et al. |
| 5,611,747 | A | | 3/1997 | Bauer et al. |
| 5,634,380 | A | | 6/1997 | Scholz et al. |
| 5,634,689 | A | | 6/1997 | Putsch et al. |
| 5,725,452 | A | | 3/1998 | Droulon et al. |
| 5,755,491 | A | | 5/1998 | Baloche et al. |
| 5,810,442 | A | | 9/1998 | Ito et al. |
| 5,871,414 | A | | 2/1999 | Voss et al. |
| 6,076,889 | A | | 6/2000 | Su et al. |
| 6,168,235 | B1 | | 1/2001 | Freund |
| 6,305,748 | B1 | | 10/2001 | Ohba |
| 6,578,921 | B2 | | 6/2003 | Koga et al. |
| 6,579,203 | B2 | | 6/2003 | Wang et al. |

(Continued)

FOREIGN PATENT DOCUMENTS

DE 103 28 300 A1 2/2005

(Continued)

OTHER PUBLICATIONS

Combined Search and Examination Report for GB0717522.7 dated Dec. 24, 2007.

(Continued)

*Primary Examiner*—Rodney B. White
(74) *Attorney, Agent, or Firm*—Brooks Kushman P.C.

(57) ABSTRACT

A tilt adjustment mechanism for a vehicle seat that is used to adjust the angular orientation of a seat back relative to a seat base. The tilt adjustment mechanism has a driver that has two protrusions that are rotated with the driver by a drive shaft. Initially the driver rotates independently of a cam assembly until a driving protrusion of the cam assembly is engaged. The movement of the driver continues to release a locking wedge that releases the seat back for adjustment.

11 Claims, 3 Drawing Sheets

U.S. PATENT DOCUMENTS

| | | |
|---|---|---|
| 6,619,743 B1 | 9/2003 | Scholz et al. |
| 6,637,821 B2 | 10/2003 | Lee et al. |
| 6,692,397 B2 | 2/2004 | Wang et al. |
| 6,715,832 B2 | 4/2004 | Dill |
| 6,755,470 B2 | 6/2004 | Iwata et al. |
| 6,918,635 B2 | 7/2005 | Finner et al. |
| 7,086,699 B1 | 8/2006 | Addison et al. |
| 7,090,298 B2 | 8/2006 | Lange |
| 7,090,299 B2 | 8/2006 | Lange |
| 7,188,903 B2 | 3/2007 | Finner et al. |
| 7,278,689 B2 * | 10/2007 | Guillouet .................... 297/362 |
| 7,281,765 B2 * | 10/2007 | Scholz et al. ............... 297/362 |
| 7,390,061 B2 * | 6/2008 | Lange ......................... 297/362 |
| 2002/0050732 A1 | 5/2002 | Koga et al. |
| 2005/0110322 A1 | 5/2005 | Cha |
| 2005/0179297 A1 * | 8/2005 | Finner et al. ................. 297/362 |
| 2005/0231017 A1 | 10/2005 | Lange |
| 2006/0220430 A1 | 10/2006 | Baloche Faurecia |
| 2006/0279121 A1 | 12/2006 | Matsumoto et al. |
| 2006/0290187 A1 | 12/2006 | Scholz et al. |
| 2006/0290188 A1 | 12/2006 | Guillouet |
| 2007/0108824 A1 | 5/2007 | Lange |

FOREIGN PATENT DOCUMENTS

| | | |
|---|---|---|
| DE | 10 2004 044 754 | 4/2006 |
| EP | 1647438 A3 | 9/2005 |
| GB | 2073311 A | 10/1981 |

OTHER PUBLICATIONS

German Office Action for 10 2007 033 024.5 dated Sep. 9, 2008.

* cited by examiner

CONTINUOUS RECLINER

BACKGROUND OF THE INVENTION

1. Field of the Invention

The present invention relates to seat tilt adjustment mechanisms having constantly engaged gears.

2. Background Art

Vehicle seats normally include a seat base and a seat back. Adjustment mechanisms are provided for vehicle seats that allow the seats to be positioned to accommodate different body types and the personal comfort of seat occupants. Adjustment mechanisms are provided for fore-and-aft positioning, lumbar support, seat height and the angular orientation of the seat back relative to the seat base. Adjustment mechanisms that adjust the angular orientation of the seat back relative to the seat base may be referred to as seat tilt adjusters.

Power seat adjusters are generally of the continuous engagement type in which gears having offset centers of rotation are constantly engaged. Power seat adjusters are driven by a bi-directional motor that provides torque to the seat adjuster to increase or decrease the angle at which the seat back is oriented relative to the seat base. Seat tilt adjusters must meet or exceed performance specifications and performance requirements of customers. Power seat adjusters must be manufactured to close tolerances to assure acceptable performance. Once the angular orientation of the seat back is adjusted, the seat back may be subject to loads or vibrations that cause the seat to chuck or vibrate. The term "chuck" refers to free movement of the seat back after the seat back position is established. Chucking is generally undesirable and many attempts have been made to eliminate this phenomenon. Seat tilt adjusters that are designed to eliminate chucking require manufacturing the parts of the seat tilt adjuster to very close tolerances. Failure to meet the tolerances required for such parts may lead to inconsistent results, unacceptable levels of scrap, and other manufacturing problems.

The present invention is directed to overcoming the above problems as summarized below.

SUMMARY OF THE INVENTION

According to one aspect of the present invention, a tilt adjustment apparatus for a vehicle seat comprises an inner gear plate and an outer gear plate that is selectively locked together by an expandible cam assembly and a driver. A drive shaft provides torque to adjust the tilt adjustment apparatus. An inner gear plate has a plurality of internal teeth disposed in a circular array on one side thereof and has a first axis of rotation. An outer gear plate has a second plurality of external teeth disposed in a circular array on one side of the outer gear plate and has a second center of rotation that is offset from the first axis of rotation. The inner and outer gears are engaged at one point on each gear so that rotation of one gear causes one gear to orbit relative to the other gear. The outer gear plate defines a bearing ring in which the expandable cam assembly is disposed. The cam assembly has a driving protrusion extending radially outwardly from an outer diameter of the cam. The cam has a locking peripheral section extending radially outwardly from an outer diameter of the cam that is spaced from the driving protrusion. A pair of locking elements selectively engage the bearing ring and the locking peripheral section of the cam. A spring engages the locking elements and biases the locking elements into engagement with the bearing ring and the locking peripheral section of the cam to selectively lock the cam to the bearing ring. A driver is assembled to the cam assembly and the drive shaft. The driver has first and second driver segments that are disposed in opposite circumferential sides of the driving protrusion of the cam. The first and second driver segments are disposed between the driving protrusion and one of the locking elements. The driver transfers torque received from the drive shaft to the driving protrusion of the cam. One of the locking elements is then engaged by the other driver segment depending upon the direction of rotation of the drive shaft in a face-to-face driving relationship to cause the outer gear plate to rotate relative to the inner gear plate. Rotation of the drive shaft releases the biasing force applied by the spring to the other locking element.

According to other aspects of the present invention, the driver may comprise an axially extending hub that extends through an opening in the cam and in the inner and outer gear plates. A driver cap may be secured to a distal end of the hub of the driver to hold the apparatus together. A dust cap may be secured between the driver cap and the outer gear plate.

According to further aspects of the invention relating to the spring, the spring may be a substantially circular spring that is radially outboard of the bearing and disposed between the driver and the outer gear plate. The spring may have first and second ends that extend in an axial direction and are received in a notch formed in one of the locking elements.

According to other aspects of the invention relating to the driver segment, the driver segment may have a first radially extending face and a second radially extending face on opposite sides of the driving protrusion that are oriented to engage the first and second driver segment, which may engage one of the locking elements. The locking element may further comprise a pair of wedges wherein the radially extending face of each of the first and second driver segments each have a wedge engaging surface that is oriented to engage one of the wedges. The driver is permitted to freely rotate relative to the cam to a limited extent prior to the driver segments engaging the driving protrusion of the cam and one of the wedges when the drive shaft is rotated.

According to another aspect of the present invention, a tilt adjustment apparatus for a vehicle seat is provided. The tilt adjustment apparatus comprises a drive shaft that provides torque for adjusting the tilt adjustment apparatus. An inner gear plate having a plurality of radially inwardly oriented teeth disposed in a circular array on one side of the first gear plate. An outer gear plate having a plurality of radially outwardly oriented teeth disposed in a circular array on one side of the second gear plate. The second gear plate defines a receptacle opening that is spaced inward from the second plurality of teeth. A bearing ring may be disposed in the receptacle opening of the outer gear plate. A cam assembly may be disposed within the bearing ring. The cam assembly comprises a driving protrusion extending radially outwardly from an outer diameter of the cam. A pair of wedges are inserted between the bearing ring and the wedge lock engaging peripheral section of the cam. The cam assembly has a wedge lock engaging peripheral section extending radially outwardly from the outer diameter of the cam. A spring engages each of the wedges and biases the wedges into engagement between the bearing ring and the wedge lock engaging peripheral section of the cam to selectively lock the cam and bearing ring together. A driver is assembled between the cam and the drive shaft that has first and second driver segments that are disposed on opposite circumferential sides of the driving protrusion of the cam. Each of the driver segments are disposed between the driving protrusion and one of the wedges. The driver transfers torque from the drive shaft through one of the first and second driver segments and, in turn, to the driving protrusion of the cam and one of the wedges depending upon the direction of rotation of the drive shaft. The driver segments contact the driving protrusion and one of the wedges in a face-to-face driving relationship that causes the outer gear plate to rotate relative to the inner gear plate.

According to other aspects of the invention as described above, torque applied to the driving protrusion of the cam and one of the wedges releases the biasing force applied by the spring to the other wedge. Rotation of the drive shaft may cause the other of the first and second driver segments to engage the driving protrusion of the cam assembly which causes the cam assembly to rotate. Rotation of the cam assembly results in the rotation of the wedge lock engaging peripheral section of the cam which releases the other of the pair of wedges. A bi-directional motor drive may be provided that is operable to rotate the drive shaft selectively in one rotational direction or in the opposite rotational direction.

According to another aspect of the present invention, a vehicle seat comprising a seat base and a seat back that is supported by a recliner adjuster in a selected angular rotation relative to the seat base. The recliner adjuster is driven by a bi-directional motor that rotates a driver. The recliner adjuster has a first armature that defines an internal gear and a second armature that defines an external gear that is smaller than and engages the internal gear at a single meshing point. A locking assembly has locking elements that selectively lock the first and second armatures together by fixing the meshing point and also includes a cam that engages the locking elements. The bi-directional motor drive rotates the driver that moves relative to the cam before engaging the driving protrusion of the cam. The driver segment then directly engages one of the locking elements and the cam to release the locking assembly and rotate the external gear relative to the internal gear to change the meshing point of the gears and adjust the angular orientation of the seat back.

According to other aspects of the invention as it relates to the vehicle seat, rotation of the driver causes the driver segments to engage a driving protrusion of the adjuster which causes the cam to rotate. The locking element may comprise first and second wedges. The driver directly engages the driving protrusion of the cam and the first wedge.

These and other features of the invention will be better understood in view of the attached drawings and the following detailed description of the illustrated embodiment.

DETAILED DESCRIPTION OF THE ILLUSTRATED EMBODIMENT

Figure 1:
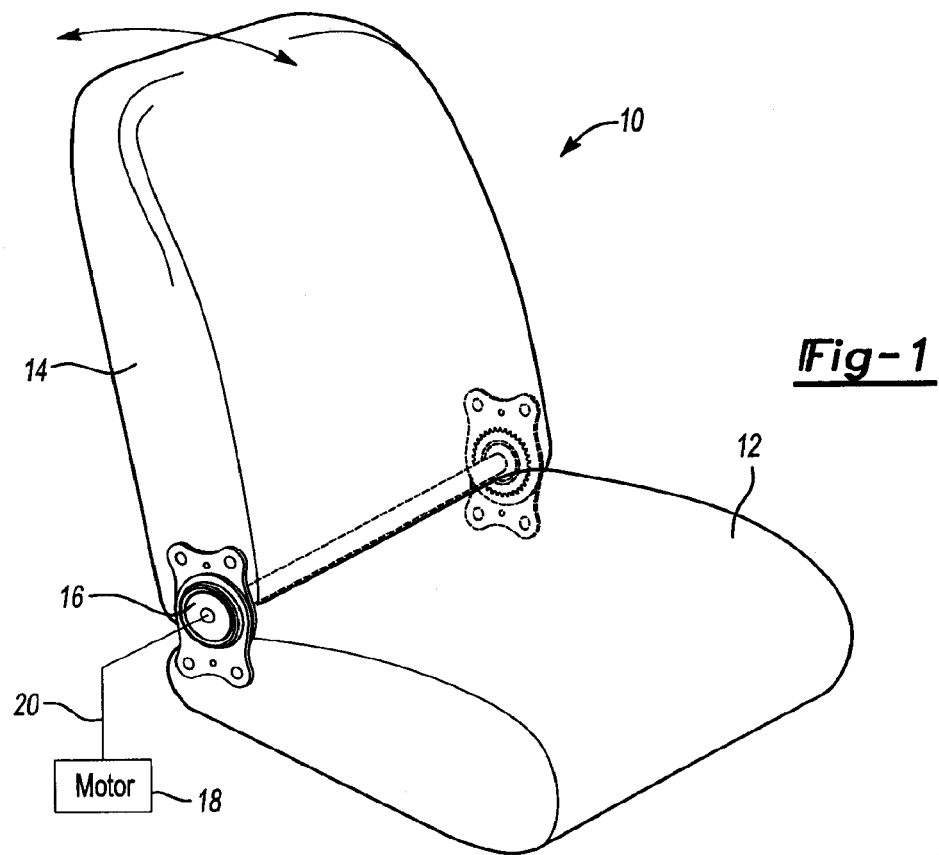
FIG. 1 is a prospective view of a vehicle seat provided with a tilt adjustment apparatus made according to the present invention.

Referring to FIG. 1, the vehicle seat 10 is illustrated that includes a seat base 12 and a seat back 14 that are interconnected by a tilt adjuster 16, or tilt adjustment apparatus. The tilt adjuster 16 is driven by a motor 18 by means of a flexible drive shaft 20 that is shown diagrammatically in FIG. 1. It should be noted that two tilt adjusters 16 are shown in FIG. 1.

Figure 2:
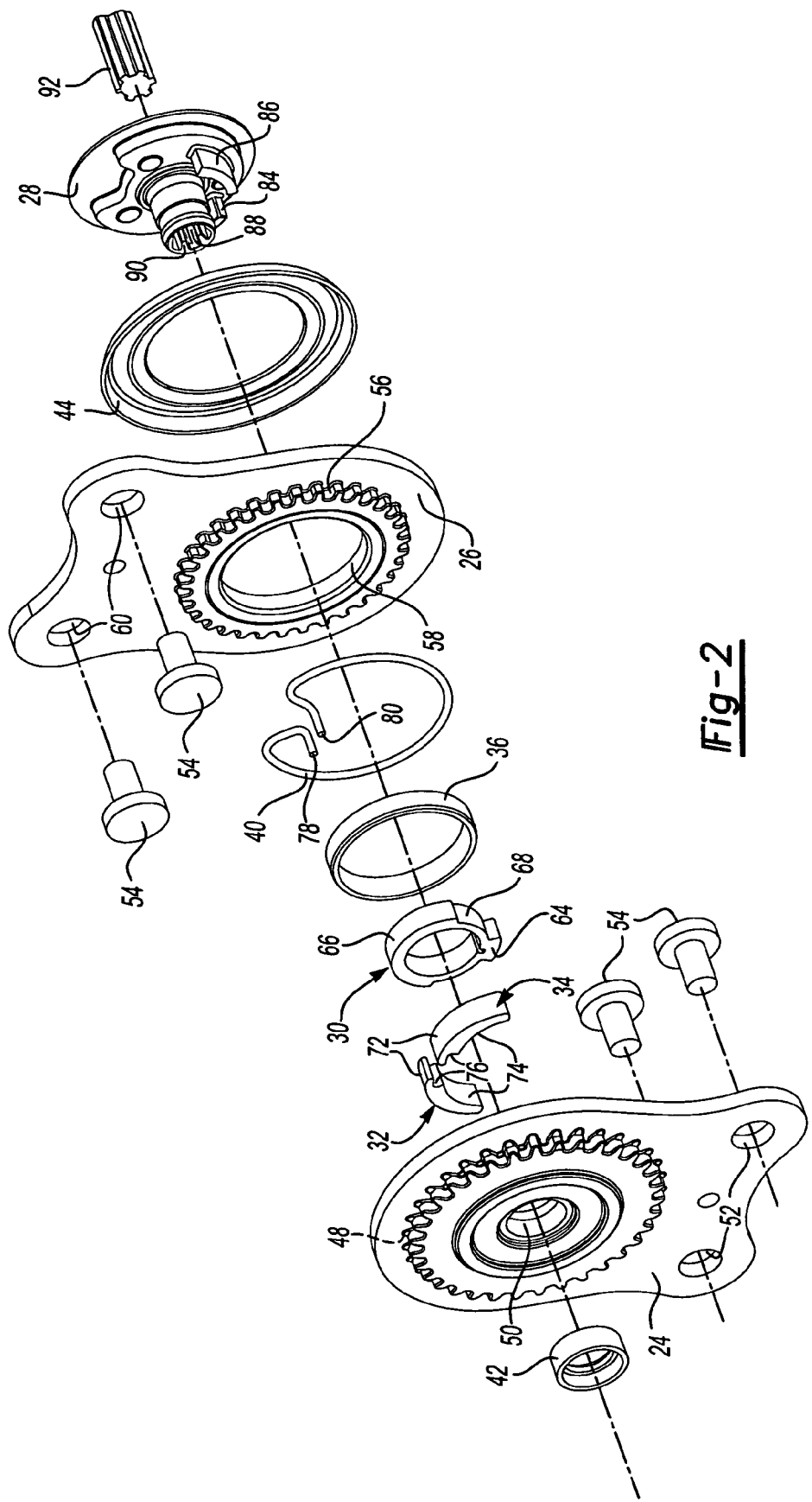
FIG. 2 is an exploded perspective view of the tilt adjustment apparatus.

Referring to FIG. 2 tilt adjuster 16 is shown in an exploded perspective view. An inner gear plate 24 and an outer gear plate 26 are shown separated from each other. A driver 28 is provided on the outer side of the outer gear plate 26. A cam ring 20 which is received within the outer gear plate 26 supports the first and second wedges 32 and 34 within a bearing ring 36. A spring 40 is operatively interposed between the first and second wedges 32 and 34 to bias the wedges 32, 34 into engagement with the cam ring 30 and bearing ring 36. A driver cap 42 is provided on the opposite side of the inner gear plate 24 that is secured to the driver 28 to hold the tilt adjuster 16 together. A dust cap 44 is provided between the outer gear plate 26 and the driver 28 to shield the component parts of the tilt adjuster 16 from contaminants.

The inner gear plate 24 is provided with a plurality of internal gear teeth 48. The inner gear plate 24 also has a central bore 50 in which the driver 28 is partially received. Rivet receiving openings 52 are provided in the inner gear plate 24 to secure the inner gear plate 24 to the seat base 12 as shown in FIG. 1. The outer gear plate 26 has a plurality of external gear teeth 56 that are engaged at a single meshing point with internal gear teeth 48 of the inner gear plate 24. The number of external teeth 56 is less than the number of internal gear teeth 48. The number of external gear teeth 56 may be at least one tooth less than the number of internal gear teeth 48. The central axis of the internal gear teeth 48 and the external gear teeth 56 are offset relative to each other. A bearing bore 58 is defined by the outer gear plate 26 that receives the bearing ring 36. The outer gear plate 26 also has rivet opening 60 in which rivets 54, or other fasteners, are received to secure the outer gear plate 26 to the seat back 14.

The cam ring 30 includes a driving protrusion 64 that extends radially outwardly from the cam ring. A locking peripheral section 66 is also provided on the cam ring 30 that extends radially outwardly from an outer diameter 68 of the cam ring 30.

The wedges 32, 34 each include a bearing engaging surface 72 and a cam engaging surface 74. Notches 76 are provided in the wedges 32 and 34 that receive first and second axially extending ends 78, 80 of the spring 40.

The driver 28 includes first and second driver segments 84, 86 that are assembled to the cam ring 30 on the surface designated as the outer diameter 68 of the cam ring 30. The first driver segment 84 and second driver segment 86 are inserted between the driver protrusion 64 and one of the first and second wedges 32, 34. The driver also includes a drive shaft receiving bore 88 that has a plurality of splines 90 that are engaged by splines 92 formed on the drive shaft 20.

Figure 3:
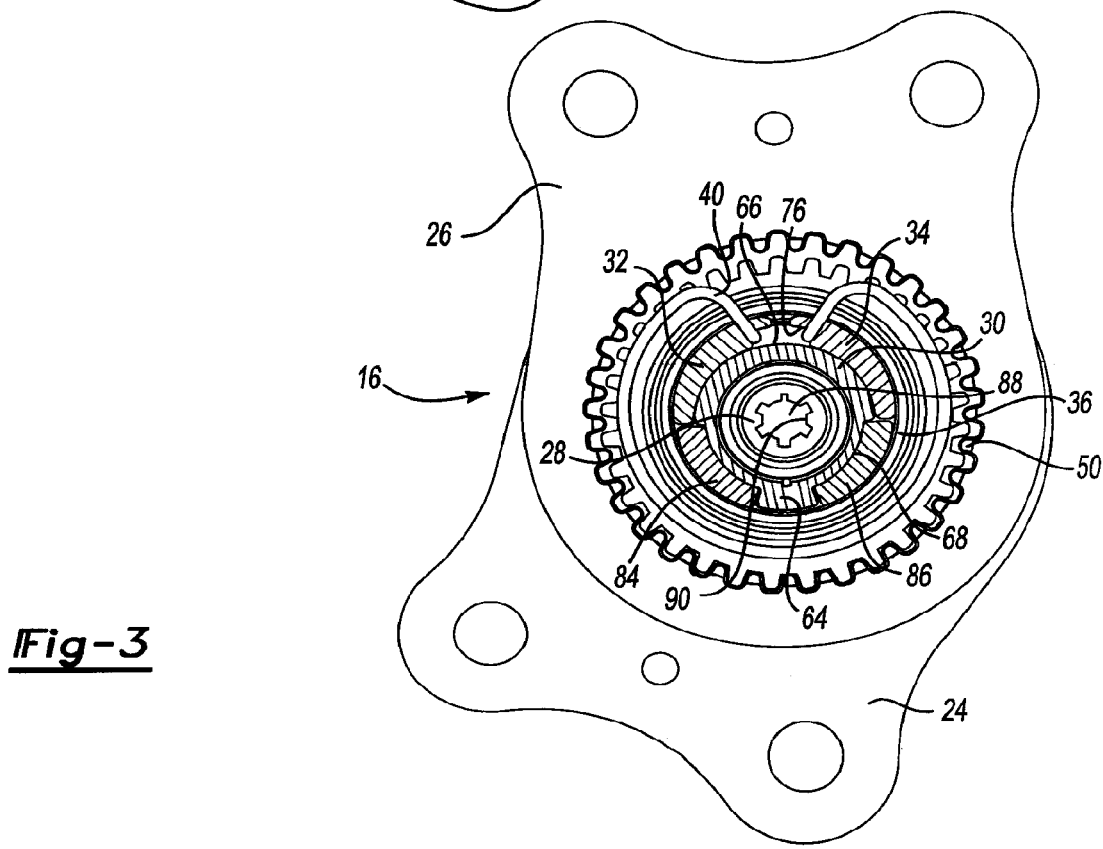
FIG. 3 is a side elevation view of the tilt adjustment apparatus.
Figure 4:
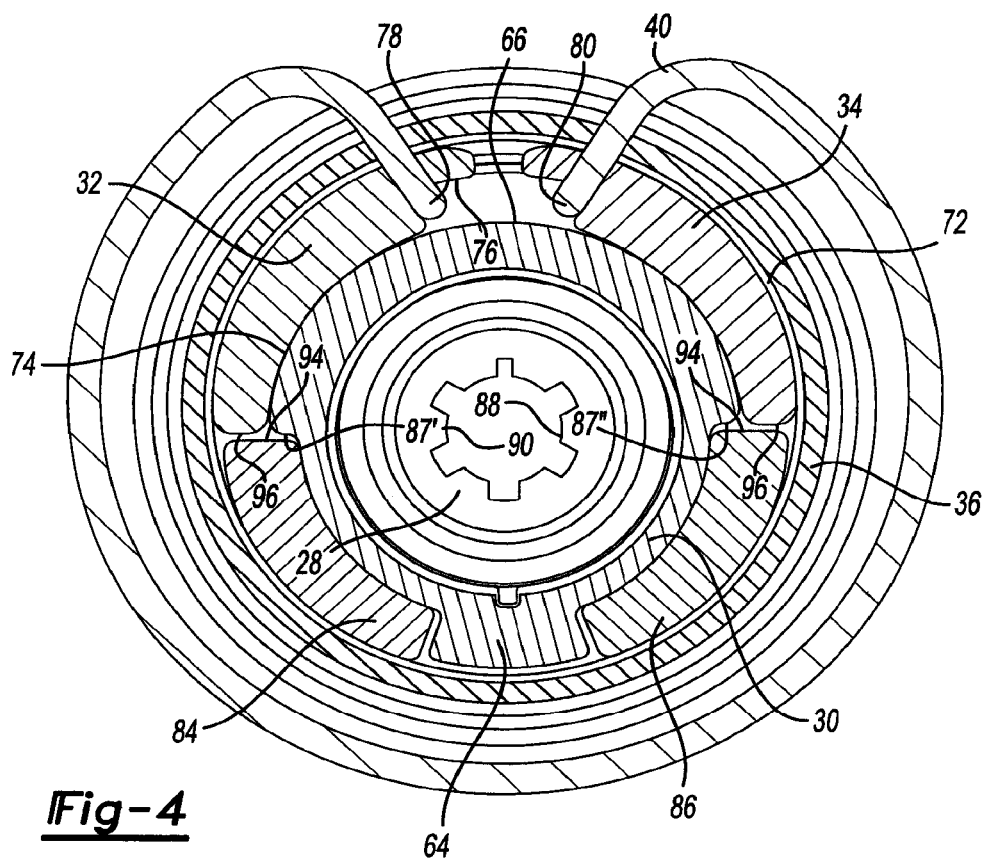
FIG. 4 is a cross-sectional view taken in a radially extending plane through the tilt adjusting apparatus.

Referring to FIGS. 1, 3 and 4, operation of the tilt adjuster 16 will be described. When a seat occupant wishes to change the angular orientation of the seat back 14 the motor 18 is actuated to rotate the drive shaft 20. With reference to FIGS. 3 and 4, the drive shaft 20 rotates the driver 28, for example in the clockwise direction and the first and second driver segments 84, 86 move with the driver 28 freely until the second driver segment 86 contacts the driving protrusion 64, of the cam 30. The first driver segment 84, in turn, contacts a shoulder 87' that is formed on the cam ring 30. At this point, the wedge 32 is released and moves toward the wedge 34 against the biasing force exerted by the spring 40. The wedge 32 is also contacted by the driver segment 84 as movement of the driver segment 84 continues. The wedges 32, 34 are at this point released from the bearing ring and the entire cam assembly including the cam ring 30, first wedge 32 and second wedge 34 slip on the bearing ring 36 allowing the outer gear plate 26 to rotate relative to the inner gear plate 24. The external gear teeth 56 rotate on the internal gear teeth 48 to change the point of engagement of the inner gear plate 24 and outer gear plate 26. The first and second driver segments 84 and 86 each include a radially extending face 94 that may engage a radially extending end 96 formed on each of the wedges 32 and 34. The faces 94 initially contact the shoulders 87' or 87", depending upon the direction of rotation, prior to contacting one of the wedges 32 and 34.

To operate the locking mechanism in the opposite direction the drive shaft 20 is rotated in the counterclockwise direction and the cam assembly rotates in the opposite direction. First driver segment 84 engages the driving projection 64 of the cam ring 30. Second driver segment 86 engages shoulder 87" that is formed on the cam ring 30. The radially extending face 94 of the second driver segment 86 engages the radially extending end 96 of the second wedge 34.

Figure 5:
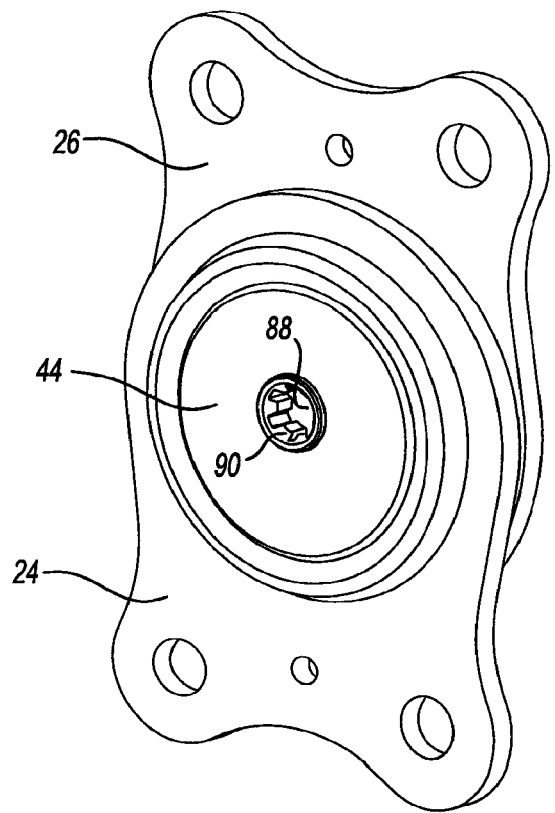
FIG. 5 is a perspective view of the tilt adjusting apparatus.

Referring to FIG. 5, the tilt adjuster 16 is shown assembled together. The tilt adjuster includes an inner gear plate 24 that is secured to the outer gear plate 26. The dust cap 44 is retained on the inner gear plate 24. The drive shaft receiving bore 88 and the splines 90 provided in the bore 88 are also shown in FIG. 5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tilt adjustment apparatus for a vehicle seat, comprising:
 a drive shaft that provides torque to adjust the tilt adjustment apparatus;
 an inner gear plate having a first plurality of internal teeth disposed in a circular array on one side of the inner gear plate and having a first axis of rotation;
 an outer gear plate having a second plurality of external teeth disposed in a circular array on one side of the outer gear plate and having a second center of rotation that is offset from the first axis of rotation, wherein the inner and outer gear are engaged at one point on each gear so that rotation of one gear causes one gear to orbit relative the other gear, and wherein the outer gear plate defines a bearing ring;
 an expandable cam assembly disposed within the bearing ring, the cam assembly having a cam that includes a driving protrusion extending radially outwardly from an outer diameter of the cam, and the cam having a locking peripheral section extending radially outwardly from an outer diameter of the cam, wherein the locking peripheral section is spaced from the driving protrusion, a pair of locking elements selectively engage the bearing ring and the locking peripheral section of the cam, and a spring engages the locking elements and biases the locking element into engagement with the bearing ring and the locking peripheral section of the cam to selectively lock the cam to the bearing ring;
 a driver is assembled to the cam assembly and the drive shaft, the driver having first and second driver segments, wherein the driver segments are integral parts of the driver and extend from one side of the driver and are disposed on opposite sides of the driving protrusion of the cam, the first and second driver segments are each disposed between the driving protrusion and one of the locking elements; and
 wherein the driver segments transfer torque from the drive shaft to the driving protrusion and by contacting one of the locking elements depending upon the direction of rotation of the drive shaft causes one of the driver segments to engage the protrusion of the driver ring, the driver continues to rotate until the other driver segment contacts the locking element which releases the wedge from the bearing ring wherein continued rotation causes the outer gear plate to rotate relative to the inner gear plate, and wherein rotation of the drive shaft releases the biasing force applied by the spring to the other locking element.

2. The apparatus of claim 1 wherein the driver further comprises an axially extending hub that extends through an opening in the cam and the inner and outer gear plates.

3. The apparatus of claim 2 further comprising a driver cap that is secured to a distal end of the hub of the driver to hold the apparatus together.

4. The apparatus of claim 1 further comprising a dust cap that is secured between the driver and the outer gear plate.

5. The apparatus of claim 1 wherein the spring is a substantially circular spring that is radially outboard of the bearing and disposed between the driver and the outer gear plate.

6. The apparatus of claim 5 wherein the spring has first and second ends that extend in an axial direction that are each received in a notch formed in one of the locking elements.

7. The apparatus of claim 1 wherein the driver segment has a first radially extending face and a second radially extending face on opposite sides of the driving protrusion that are oriented to engage the first and second driver segments, wherein the first and second driver segments engage one of the locking elements.

8. The apparatus of claim 7 wherein the locking element further comprises a pair of wedges, and wherein the radially extending face of each of the first and second driver segments each have a wedge engaging surface that is oriented to engage one of the wedges.

9. The apparatus of claim 1 wherein the pair of locking elements are a pair of wedges, and wherein the driver freely rotates relative to the cam to a limited extent prior to the driver segments engaging the driving protrusion of the cam and one of the wedges when the drive shaft is rotated.

10. The apparatus of claim 1 wherein the outer gear plate has a predetermined number of teeth and the inner gear plate has at least one more tooth than the outer gear plate.

11. The apparatus of claim 1 wherein the locking element further comprises a pair of wedges.

* * * * *